Figures 1, 2:
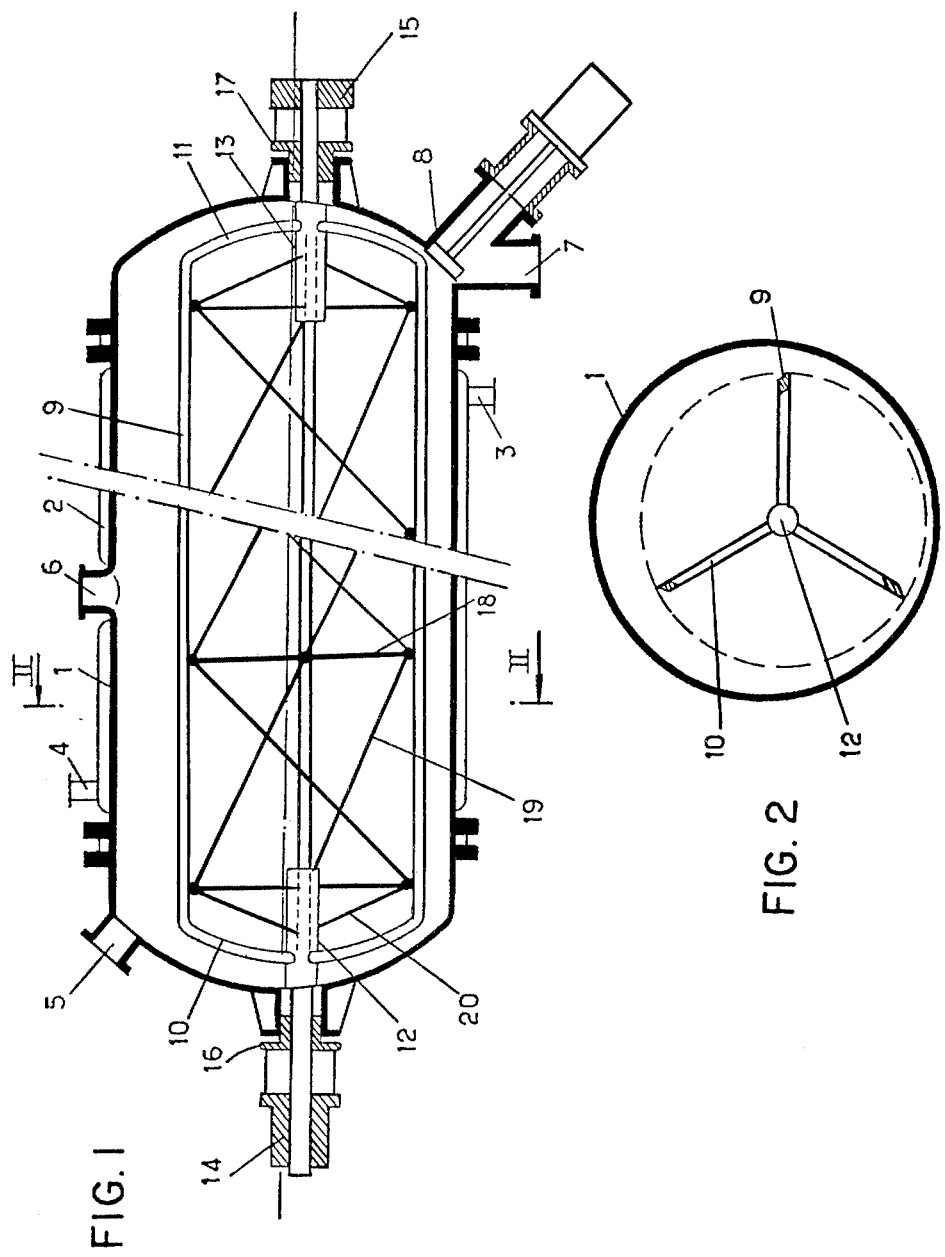

United States Patent [19]

Azemar et al.

[11] 4,109,069

[45] Aug. 22, 1978

[54] HORIZONTAL AUTOCLAVE FOR THE BULK PREPARATION OF POLYMERS AND COPOLYMERS ON A BASIS OF VINYL CHLORIDE

[75] Inventors: Michel Azemar, Irigny; Lucien Vigliecca, Caluire, both of France

[73] Assignee: Rhone-Poulenc Industries, Paris, France

[21] Appl. No.: 776,587

[22] Filed: Mar. 11, 1977

Related U.S. Application Data

[62] Division of Ser. No. 634,834, Nov. 24, 1975.

[30] Foreign Application Priority Data

Dec. 4, 1974 [FR] France .................................. 74 39613

[51] Int. Cl.² ........................ C08F 2/02; C08F 114/06
[52] U.S. Cl. ...................................... 526/65; 23/290; 526/88
[58] Field of Search ................... 526/88, 65, 344, 345; 259/109

[56] References Cited

U.S. PATENT DOCUMENTS

| | | | |
|---|---|---|---|
| 3,522,227 | 7/1970 | Thomas | 526/344 X |
| 3,538,067 | 11/1970 | Bognar | 526/344 X |
| 3,681,308 | 8/1972 | Irvin | 526/352 X |
| 3,820,761 | 6/1974 | Rigal | 259/109 |

FOREIGN PATENT DOCUMENTS 1,360,251  3/1964  France ................................ 526/344 X

*Primary Examiner*—Christopher A. Henderson, Jr.
*Attorney, Agent, or Firm*—McDougall, Hersh & Scott

[57] ABSTRACT

A horizontal autoclave for the bulk preparation of polymers and copolymers on a basis of vinyl chloride. It is equipped with a stirrer system of the frame type comprising one or more coaxial frames. The axis of the frames in eccentric with respect to the axis of the autoclave and the periphery of the active portion of the frames forming blades passes in the vicinity of the wall of the autoclave substantially along its lower generatrix.

3 Claims, 2 Drawing Figures

HORIZONTAL AUTOCLAVE FOR THE BULK PREPARATION OF POLYMERS AND COPOLYMERS ON A BASIS OF VINYL CHLORIDE

This is a division of application Ser. No. 634,834, filed Nov. 24, 1975.

This invention relates to an autoclave having a horizontal axis, for the bulk preparation of polymers and copolymers on a basis of vinyl chloride. It also relates to the process for the bulk preparation of polymers and copolymers on a basis of vinyl chloride carried out by means of said autoclave.

It has previously been proposed that the bulk preparation of polymers and copolymers on a basis of vinyl chloride may be effected in two steps, carried out in separate apparatuses, by a process which consists of realizing, in a first step known as a prepolymerization step, a limited polymerization with high turbulent agitation, until a conversion factor for the monomer or monomers of the order of 7% to 15% is achieved, and then of realizing, in a second step, a final polymerization operation under slow stirring speed, this stirring speed being however still sufficient to insure good thermal control of the reaction medium until the completion of the polymerization or copolymerization reaction.

This process and its variants have been described in detail in the following French Patents and Certificates of Addition: numbers 1,382,072; 84,958; 84,965; 85,672; 89,025; and numbers 1,436,744; 87,620; 87,623; 87,625; 87,626.

According to one particular form of embodiment of the process, the final polymerization operation is carried out in an autoclave having a substantially horizontal axis, which is equipped with a stirring system of the frame type comprising one or more frames fixed coaxially onto a single rotating shaft passing through the autoclave along its axis, whereby the periphery of the active portion of the frames forming blades hugs substantially the internal contour of the autoclave. Such an autoclave is described in French Pat. No. 1,360,251.

According to another form of embodiment of the process, the final polymerization operation is carried out in an autoclave having a substantially horizontal axis, furnished with a stirring system of the frame type comprising one or more frames, said frames being fixed coaxially onto two journals oriented along the axis of the autoclave, whereby the periphery of the active portion of the frames forming blades hugs substantially the internal contour of the autoclave, said blades being connected to one another by a bracing. Such an autoclave is described in French Pat. No. 2,145,070.

The substantially horizontal autoclave, forming the subject of the present invention, is equipped with a stirring system of the frame type, comprising one or more coaxial frames. It is characterized by the fact that the axis of said frames is eccentric with respect to the axis of the autoclave, and that the periphery of the active portion of the frames forming blades passes in the vicinity of the wall of the autoclave substantially along its lower generatrix.

It has surprisingly been established that it is not necessary for the blades to pass in the vicinity of the wall of the autoclave over the entirety of the lateral surface of the autoclave in order to prevent the formation of encrustations on the walls of the autoclave during the bulk polymerization of monomeric compositions on a basis of vinyl chloride. They should, on the other hand, pass in the vicinity of the wall of the autoclave substantially along its lower generatrix in order to insure a complete removal of the polymer produced during the operation of discharging the autoclave.

For a satisfactory realization of the invention, the ratio of the diameter of the cross-section of the cylinder generated by the frames, during the course of their rotation, to the diameter of the cross-section of the autoclave lies in the range 0.5 to 0.95.

The autoclave, according to this invention, advantageously comprises a number of frames or half-frames, whereby their number is not limited, fixed either to a rotating shaft, or to two journals in such a manner as to obtain the best operating conditions from a mechanical point of view. Thus, in the case where there are two frames, these are perpendicular (180°); when the apparatus comprises three half-frames, the angle between each adjacent two is 120°.

It is advantageous to insure the stiffness of the stirring system, either by means of supporting arms connecting the blades to the rotating shaft, in the case where the frames are fixed onto a rotating shaft, or by means of a bracing system for the active portions of the frames, in the case where the frames are fixed onto two journals.

The active portion of the frames forming blades may be either rectilinear, or slightly curved. This latter arrangement is achieved by disposing the two ends of the blades on two generatrices of the rotating shaft or of the journals which are not situated in an extension one of the other, the offset between the two ends being at a maximum one revolution.

According to one especially advantageous variant, the rotating shaft or the journals entraining the frames, the blades of the frames and, where applicable, the bracing members are hollow and may be traversed internally by a heat exchange fluid.

By comparison with the two autoclaves previously described, the autoclave according to this invention possesses the following advantages;

For an autoclave of a given volume, the space occupied by the stirring system is less and consequently the useful volume of the autoclave is greater.

The autoclave is simpler to construct. The dimensional tolerances are in fact much greater, since it is only necessary to achieve a minimum clearance substantially along the lower generatrix of the autoclave.

Since the blades of the stirring system pass relatively remote from the top wall of the autoclave, it is possible to introduce items of equipment between the wall and the stirring system. These items of equipment, such as atomizers, piping, pressurized water washing nozzles, may be placed above the level of the reaction medium or between the surface level of the reaction medium and the stirring system (temperature reading devices, sampling devices).

The arrangement of the stirring system facilitates and makes it possible to carry out more completely the hydraulic cleaning of the autoclave by means of pressurized water jets, since it is now possible to introduce the washing water nozzles at the summit of the autoclave between the stirring system and the wall and to carry out cleaning while the stirring system is in rotation. It is thus not necessary to move the nozzles in the autoclave and it is possible automatically to clean the external face of the blades of the stirring system.

The escape or loss by entrainment of polymer particles is reduced since, because the stirring system can be entirely immersed in the reaction medium, said particles are not projected by the blades outside the reaction medium into the gaseous phase. This enables the filling factor of the autoclave to be increased. In fact, the limiting factor to the charging of the autoclave is the entrainment outside the autoclave, during the degassing of the monomeric composition at the end of polymerization, of those polymer particles which have escaped or taken flight from the body of the medium. The smaller the fraction of the cross-section of the autoclave situated outside the reaction medium, that is to say the larger the volume of the reaction medium, the greater will be the speed of entrainment of the particles. If escape of particles does not take place, it is therefore possible to utilize a larger volume of reaction medium without causing entrainment during the degassing of the monomeric composition at the end of polymerization.

Mechanical vibrations are reduced because, since the stirring system can be entirely immersed in the reaction medium, the blades are always subjected to a resisting couple since they do not pass in turn into a gaseous phase where the resistance is zero.

The autoclave according to this invention is especially well suited for carrying out the final polymerization operation of the process of preparing in bulk polymers and copolymers on a basis of vinyl chloride in two steps carried out in two separate apparatuses.

A description is hereinafter given, by way of example, and with reference to the single drawing attached hereto, of a form of embodiment of a polymerization autoclave equipped with a stirring system in accordance with this invention, in which FIG. 1 is a vertical sectional view along the axis of the autoclave; and FIG. 2 is a vertical section perpendicularly to the axis of the autoclave along the line II—II in FIG. 1, illustrating the arrangement in the case where three half-frames are used.

The horizontal-axis autoclave 1 is surrounded by a jacket 2, through which there circulates a heat exchange fluid entering through a nozzle 3, connected by a pipe (not shown) to a fluid source, and leaving through a nozzle 4. The autoclave 1 comprises, at its upper part, a nozzle 5 for the introduction of the monomer and of the necessary reagents and a nozzle 6 for the removal of the unreacted monomer at the end of the operation. At its lower part, the autoclave is provided with a nozzle 7, controlled by a valve 8, for discharging the polymer. The nozzles 5 and 7, for introduction of the monomer and removal of the polymer, are preferably situated at opposite ends.

The autoclave 1 is equipped with a frame-type stirrer or agitator, comprising three half-frames disposed 120° apart and constituted of a strip forming a blade, such as 9, fixed at its ends 10 and 11 to two journals 12 and 13 oriented along an axis which is eccentric with respect to the axis of the autoclave, these blades passing in the vicinity of the wall of the autoclave along its lower generatrix. The journals 12 and 13 ted along an axis which is eccentric with respect to the axis of the autoclave, these blades passing in the vicinity of the wall of the autoclave along its lower generatrix. The journals 12 and 13 are supported by bearings 14 and 15, sealing being effected by stuffing boxes 16 and 17.

The blades, such as 9, are connected to one another by a bracing system comprising a first series of three braces, such as 18, and a second series of three braces, such as 19 and 20.

The journals 12 and 13, the blades, such as 9, and the braces, such as 18, 19 and 20, may be hollow and traversed internally by a heat exchange fluid.

We claim:

1. A method for the bulk preparation of polymers and copolymers on a basis of vinyl chloride in two steps, carried out in separate apparatuses, according to which there is effected, in a first step known as prepolymerization step, a limited polymerization with high turbulence agitation until a conversion factor of the monomer or monomers of the order of 7% to 15% is obtained, and then in a second step a final polymerization operation with slow stirring speed sufficient to insure a good thermostatic control of the reaction medium until the end of the polymerization or copolymerization reaction, said method being characterized by the fact that the final polymerization operation is effected in the autoclave equipped with a stirrer system of the frame type having one or more coaxial frames mounted for rotational movement about a horizontal axis eccentrically spaced downwardly from the axis of the autoclave whereby the blades of the frame pass in close proximity to the bottom wall of the autoclave and remote from the top wall of the autoclave in which the ratio of the diameter of the cylinder generated by the frames to the diameter of the autoclave is within the range of 0.5 to 0.95.

2. A method according to claim 1, characterized by the fact that the final polymerization operation is carried out on a reaction medium in which the stirrer system of the autoclave is entirely immersed.

3. A method as claimed in claim 1 which includes the step of introducing the reaction medium of the monomer in an amount partially to fill the autoclave to provide a vapor space between the reaction medium and the top of the autoclave and which includes the step of immersing the stirrer system completely within the reaction medium to avoid projecting particles of reaction medium into the vapor space.

* * * * *

UNITED STATES PATENT OFFICE
CERTIFICATE OF CORRECTION

Patent No. 4,109,069            Dated   August 22, 1978

Inventor(s)   Michel Azemar, Lucien Vigliecca

It is certified that error appears in the above-identified patent and that said Letters Patent are hereby corrected as shown below:

Col. 4, lines 5-8, delete "The Journals...lower generatrix"

Signed and Sealed this

First Day of May 1979

[SEAL]

Attest:

RUTH C. MASON
Attesting Officer

DONALD W. BANNER
Commissioner of Patents and Trademarks